United States Patent Office 3,268,279
Patented August 23, 1966

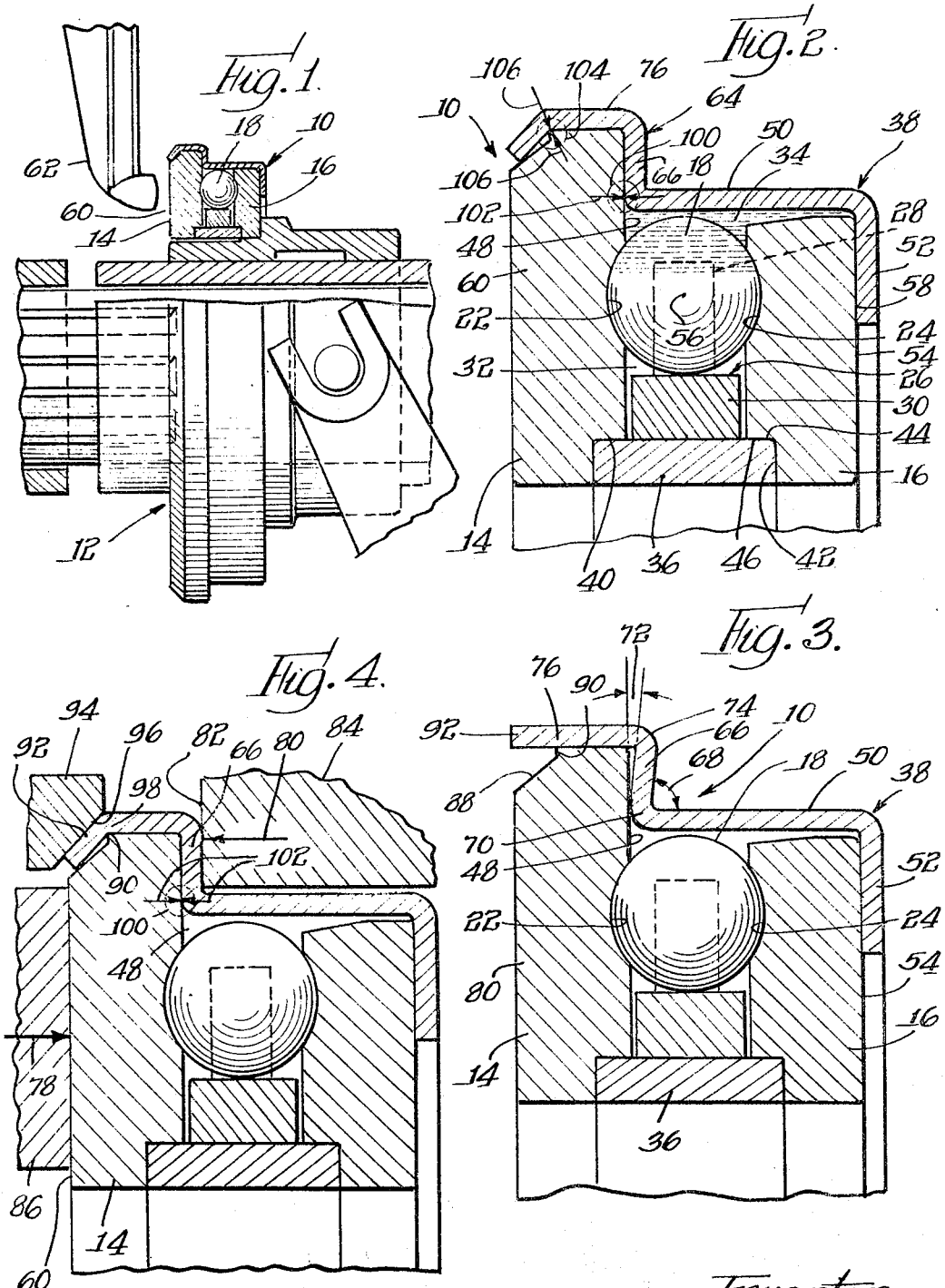

3,268,279
SEALED THRUST BEARING
Daniel Frank Greby, Maywood, Ill., assignor to Textron Inc., Providence, R.I., a corporation of Rhode Island
Filed Oct. 21, 1965, Ser. No. 499,281
5 Claims. (Cl. 308—233)

The present invention relates to sealed thrust bearings in which thrust loads are transmitted between two thrust rings by an annular series of rotary load bearing elements housed within sealed bearing space and having rolling engagement with races on the two thrust rings. Characteristically, sealed thrust bearings of the type with which the invention is concerned are used in environments in which relubrication of a bearing after it is put into service is impractical. For example, such bearings are used by the million in automotive vehicles as clutch release bearings.

A sealed thrust bearing used, for example, as a clutch release bearing in an automobile, has a service life that is limited substantially to the time of service during which the initial charge of lubricant placed in the bearing at the time of manufacture will provide effective lubrication for the bearing. Once effective lubrication of the bearing ceases, the bearing wears fast and fails rapidly in service.

The total quantity of lubricant that can be charged into a sealed thrust bearing to advantage at the time of manufacture is rather limited. Consequently, retention of the lubricant within the bearing after it is placed into service adds to its service life.

Equally vital to the acceptability and, hence, the practical utility of a sealed thrust bearing that is to be used is large numbers in mass produced machinery, is a suitability of the bearing for economical manufacture.

One object of the invention is to provide an improved thrust bearing of the character recited having a reliability in service that is enhanced by assurance that none of the lubricant placed in the bearing will escape through the static attachment of one thrust ring to an outer shell member of the bearing which spans the two bearing rings and forms a capillary seal with the other thrust ring opposing the thrust ring to which the outer shell member is statically attached.

Another object is to provide an antifriction thrust bearing of the character referred to in which an outer shell member forms an effective capillary seal with one of two thrust rings of the bearing, spans the two thrust rings, and establishes with the other thrust ring a high pressure static seal that is maintained permanently by the bearing structure to the end that the initial charge of lubricant in the bearing is precluded permanently from escaping through the static seal between the outer shell member and said one thrust ring.

Another object is to provide a new and improved sealed thrust bearing of the character recited in the preceding objects which is inherently well suited for economical manufacture.

Other objects and advantages will become apparent from the following description of the invention taken in conjunction with the attached drawings, in which:

FIGURE 1 is a partially sectioned side view of a clutch release, thrust bearing constructed in accordance with the invention for incorporation in a clutch release assembly as illustrated;

FIG. 2 is a radial sectional view on an enlarged scale of the completed sealed thrust bearing which forms the clutch release bearing of the assembly illustrated in FIG. 1;

FIG. 3 is a radial sectional view similar to FIG. 2, showing the component parts of the bearing as independently fashioned and assembled in relation to each other in preparation for stressing and deformation of the bearing structure to complete the bearing in accordance with the invention; and FIG. 4 is a radial sectional view of the bearing structure similar to FIG. 3, and illustrating the manner in which bearing stressing and deformation dies and tools are used to stress and deform the bearing structure to produce the bearing assembly illustrated in completed form in FIG. 2.

Referring to the drawings in greater detail, the sealed thrust bearing 10 constructed in accordance with the invention and incorporated into a typical clutch release assembly 12, as illustrated in FIG. 1, comprises two concentric thrust rings 14, 16 spaced apart axially by an annular series of thrust load bearing balls 18 having rolling engagement with two axially confronting grooves or races 22, 24 formed in the respective thrust rings 14, 16, as illustrated in FIG. 2. The thrust load bearing balls 18 in the construction illustrated are maintained in spaced relation to each other by a circular spacer or ball separator 26 intervening between the two thrust rings 14, 16. The ball spacer or separator 26 comprises a plurality of ball spacing projections or tangs 28 extending radially outward between adjacent balls 18 from a common annular base 30 of ring-like shape intervening rotatably between the thrust rings 14, 16 just inwardly of the balls 18, as shown in FIG. 2.

The thrust load bearing balls 18 and ball spacer 26 operate within an internal bearing space 32 contained within the bearing 10, as will presently appear, and commonly referred to as "grease space."

The bearing 10, like sealed bearings of the prior art, used without relubrication in a clutch release assembly 12, for instance, will, as a practical matter, function acceptably to carry thrust loads in service only so long as the mutually engaging working parts of the bearing are effectively lubricated. Such a bearing is subject to accelerated wear and rapid failure in service whenever there is no longer effective lubrication of working elements, particularly the load bearing balls 18, races 22, 24 and ball spacing tangs 28.

The volume of the void or grease space within the bearing 10 is limited to a rather low value by the inherent structural character of the sealed thrust bearing. Moreover, the volume of the grease or lubricant 34, indicated in FIG. 2 by shading also denoted by the number 34, that can be placed in the void or grease space 32 and used effectively in lubricating the bearing is even more limited, by reason of the inherent inability of the bearing to accommodate and use effectively a volume of grease equal to the volume of the void or grease space 32.

The vital importance of avoiding wastage of the initial charge of grease 34 placed in the bearing at the time of manufacture is evident from the utter dependence of the bearing on the initial charge of grease to provide the continued lubrication of the bearing which is essential to its service life.

The internal grease space 32 is isolated from the external environment and sealed against the escape of grease 34 by the coaction of the opposed thrust rings 14, 16 with an inner bearing shell member or liner 36 and an outer bearing shell member 38 which form component elements of the bearing 10, as will presently appear. Moreover, the liner 36 and outer shell member 38 coact with the opposed thrust rings 14, 16 to retain all of the bearing components in assembled coacting relationship to each other.

In the preferred construction, the inner liner member 36 is formed by a cylindrical ring having one end press fitted into an adjacent annular recess 40 formed in the inner marginal edge of the thrust ring 14 to form a tight static junction between the inner liner 36 and the thrust ring 14.

The opposite end of the inner liner 36 fits into an adjacent annular recess 42 in the inner marginal edge of the thrust ring 16, so that the outer cylindrical surface 44 of the liner 36 has a close running fit with a cylindrical surface 46 forming one side of the recess 42, with the result that the close fitting surfaces 46 and 44 on the thrust ring 16 and the liner 36 respectively produce a capillary seal, sometimes referred to in this art as a "labyrinth" seal, providing an effective barrier against the escape of grease from the space 32 past the inner shell ring 36 and thrust ring 16 which rotate in relation to each other.

The outer shell member 38 serves a multiplicity of functions. As will presently appear, it axially spans the two thrust rings 14, 16 and forms an effective circumferential seal with each of the thrust rings 14, 16 while allowing rotation of the thrust rings in relation to each other and serving to retain both thrust rings in continuous effective engagement with all of the bearing balls 18.

At this point, it should be noted that the thrust ring 14 is made considerably larger in diameter than the thrust ring 16 and has a flat inner surface 48 which extends radially outward from the race 22.

The outer shell member 38 comprises an axially extending cylindrical portion 50 encircling the race 16 and encircling the annular series of thrust bearing balls 18 radially outward of the orbital path of the balls 18 but a substantially distance radially inward of the outer periphery of the larger thrust ring 14.

Having reference to FIG. 2, the right-hand end of the cylindrical outer shell portion 50 is integrally joined with a generally flat annular flange 52 which is turned radially inward in relation to the cylindrical portion 50 and extends inwardly in close fitting generally parallel relation to the outer flat face 54 of the thrust ring 16. As shown, the flange 52 extends from the cylindrical shell portion 50 radially inward to an inner extremity located radially inward of the radial positions of the centers 56 of the bearing balls 18. The close fitting relationship of the shell flange 52 to the thrust surface 54 forms a capillary seal, sometimes referred to in this art as a "labyrinth" seal, providing an effective barrier against the escape of grease from the space 32 past the interface 58 between the thrust ring surface 48 and shell flange 52.

It is evident upon viewing the bearing in radial section as shown in FIG. 2 that the radially outward extent of the grease space 32 is defined and limited by the outer shell 38, and that the sealing flange 52 and the capillary seal formed between the shell flange 52 and thrust ring 16 extend an extensive distance radially inward of the radially outer extremity of the grease space 32.

The capillary seal provided between the shell flange 52 and the thrust ring surface 54 is very effective for its intended purpose of preventing the escape of grease from the grease space 32, while at the same time permitting rotation of the thrust ring 16 in relation to the shell 38 and holding the thrust ring 16 against axial movement away from the thrust bearing balls 18.

It should be noted at this point that the thrust ring 14, which is larger in diameter than the thrust ring 16, has an exposed flat outer face 60 which confronts clutch release arms 62 (only one of which is shown in FIG. 1) in the typical clutch release assembly 12 in which the bearing 10 is used. Upon operation of the bearing 10 to apply thrust to the release arms 62, the thrust ring 14 engages and rotates with the release arms 62.

The outer bearing shell 38 rotates with the thrust ring 14 and has a static circumferential connection 64 with the thrust ring.

As a practical matter, the static circumferential connection 64 between the outer shell member 38 and the thrust ring 14 is located at the outer periphery of the grease space 32 with the necessary result that centrifugal force acts on the grease or lubricant 34 when the bearing is in dynamic operation to urge the grease outwardly, so that it seeks to escape from the grease space 32 through the static juncture or connection of the outer shell 38 to the thrust ring 14. Any failure of the static connection 64 to preclude the outwardly urged grease 34 from escaping through the static connection 64 as it is located on the outer periphery of the grease space 32 will result in a wastage of the limited supply of lubricant in the bearing, with a consequent shortening of bearing life.

Escape of lubricant through the static juncture or connection 64 of the outer shell 38 to the thrust ring 14 of the bearing 10 is precluded with assurance by a construction of the bearing well suited for economical manufacture, and providing an intensive and most effective sealing pressure between the outer bearing shell 38 and the thrust ring 14 which is maintained permanently by the bearing structure.

Prior to its assembly with coacting elements of the bearing 10, the outer shell member 38 is shaped through fabrication so that, upon assembly of the bearing, as will be described, the outer shell member 38 and the larger thrust ring 14 mutually cooperate to produce high intensity grease sealing pressures between the shell member 38 and the ring 14 that are permanently maintained by a residual stress induced in the outer shell member 38 by assembly of the bearing parts together.

Prior to its assembly with coacting bearing parts, the outer shell member 38 is fashioned from metal stock, which is relatively thin in relation to the thickness of the thrust rings 14, 16, to have the shape in transverse radial section shown in FIG. 3.

At the end of the cylindrical portion 50 adjacent the radially extending flat thrust ring surface 48, the outer shell member 38 is turned sharply outwardly to form a spring flange 66, FIG. 3, having a truncated conical shape such that the spring flange 66 as viewed in radial section is disposed at an acute angle 68 in relation to the cylindrical bearing shell portion 50 with which the flange 66 is integrally joined by a sharp bend 70.

The positional and dimensional relationships of the parts is such that when both races 22, 24 firmly engage the balls 18 and the capillary sealing flange 52 is closely contiguous to the thrust ring surface 54, as described, the sharp bend 70 in the outer shell member 38 is positioned immediatley adjacent the inner thrust ring face surface 48.

In the preferred construction illustrated, the acute angle 68 which the spring flange makes with the cylindrical shell portion 50 is of the order of 87 to 89 degrees, so that the permanent deformation and shaping of the outer shell member 38 prior to assembly of the bearing causes the conical spring flange 68 to diverge from the inner thrust ring surface 48 in a radially outward direction at an angle 72, FIG. 3, of the order of 1 to 3 degrees.

The initially conical spring flange 68 has a transverse width in a radial direction which is rather extensive in relation to the size of the bearing balls 18 and the size of the thrust ring 14, the transverse radial width of the spring flange 66 in the preferred construction being substantially equal to one-half the diameter of the individual balls 18.

At the outer edge of the conical spring flange 66 another sharp turn 74 in the outer shell member 38, as viewed in radial section, FIG. 3, connects the spring flange 66 with a cylindrical support lip 76 which encircles the outer periphery of the larger thrust ring 14.

As previously indicated, the spring flange 66 assumes the conical shape or form described when the outer shell member 38 is free of externally applied stress, and hence free to assume the form it has by reason of its permanent deformation as it is fabricated prior to assembly with its coacting bearing parts.

After the bearing parts are assembled together with the outer shell member 38 encircling the balls 18 and thrust rings 14, 16, as illustrated in FIG. 3, the initially conical spring ring 66 is forcibly flattened against the inner thrust ring face 48 by opposing axial forces applied respectively to the thrust ring 14 and the spring flange 66, as indicated by the arrows 78, 80 in FIG. 4.

While the spring flange 66 is supported by the flat annular face 82 of an annular anvil or die member 84, as illustrated in FIG. 4, axial force 78 is applied inwardly to the thrust ring 14 by a circular pressure member 86 pressed against the outer face 60 of the thrust ring 14, as illustrated. The axial force 78 applied inwardly to the thrust ring 14 is opposed by an equal axial force 80 applied by the flat anvil surface 82 to the outer periphery of the initial conical spring flange 66, to produce the desired flattening of the spring flange 66 against the thrust ring surface 48.

As shown in FIG. 3, the outer periphery of the thrust ring 14 is cut away at the corner remote from the inner face surface 48 to form an annular notch 88 which provides clearance for inward crimping of the mounting lip 76, as will presently appear, and which shapes the thrust ring 14 to form on the outer periphery of the ring 14 a sharp corner 90 located axially inward of the outer ring surface 60 and spaced axially from the inner ring face 48.

With the spring flange 66 flattened against the inner thrust ring surface 48 as described, the free marginal edge 92 of the cylindrical mounting lip 76 is bent sharply around the thrust ring corner 90 in a radially inward direction by an annular crimping tool 94, FIG. 4, which is moved axially toward the support die or anvil 84, causing a conical swaging or crimping surface 96 on the tool 94 to turn the free marginal edge 92 radially inward.

As swaged radially inward around the sharp corner 90, the crimped marginal edge 92 fits into the annular notch 88, making a sharp turn 98, FIG. 4, around the thrust ring corner 90, so that the crimped edge 92 becomes a generally conical anchoring flange (also denoted by the number 92) which coacts with the sharp corner 90, to positively hold the outer periphery of the spring flange 66 from retraction away from the inner thrust ring surface 48 after the axial forces 78, 80 used in assembling the bearing are removed.

As a consequence, the annular spring flange 66 is held flat against the thrust ring surface 48 in the assembled bearing. Even though flattened, the initially conical spring flange 66 seeks incessantly to return to its initial conical shape by reason of the elasticity of the metal from which the outer shell member 38 is formed and the twisting stress induced in the spring flange, as an incident to its forcibly being held in a flat position rather than in its natural conical shape.

The induced residual stress in the outer shell member 38 continuously seeking to restore the undistorted conical shape, functions permanently to produce and maintain circumferential areas of high pressure sealing engagement of the outer shell member 38 with the thrust ring 14, to produce highly effective and most dependable seals against the outward escape of lubricant through the static connection 64 of the outer shell 38 to the thrust ring 14.

The residual stress in the spring flange 66 continuously urges the inner periphery of the spring flange 66 hard against the ring surface 48 to produce a circumferential zone 100 of pressure engagement of the shell member 38 against the sealing surface 48 which zone, by virtue of the elasticity of the structure and the twisting character of the stress in the spring flange 66, is very narrow radially and concentrated at the juncture of the inner periphery of the spring flange 66 with the cylindrical shell portion 50.

Having reference to FIGS. 1 and 2, the narrow zone 100 where the intense sealing pressure is produced and concentrated by the residual stress in the spring flange 66 is represented graphically by a circular shade line and the opposing sealing pressure forces are represented graphically by arrows 102. The same residual stress in the spring flange 66 which urges the inner periphery of the flange hard against the surface 48 also urges the outer periphery of the flange 66 in the opposite direction to permanently apply an axial force to the mounting lip 76 and to continuously force the base of the crimped anchoring flange 92 hard against the sharp thrust ring corner 90.

The result is the creation of a second narrow annular zone 104, encircles by a circular shade line in FIG. 2, in which high intensity sealing pressure, represented graphically by arrows 106 in FIG. 2, is created between the outer shell member 38 and thrust ring 14 and confined to a narrow band generally centered with respect to the annular corner 90 to form a second effective seal against the escape of lubricant through the static connection 64 between the shell member 38 and thrust ring 14.

The sealing pressure forces 106 concentrated in the narrow annular sealing zone 104, like the sealing pressure forces 102 concentrated in the narrow sealing zone 100, are permanently maintained by the residual stress in the flattened spring flange 60 which permanently seeks to regain its intially conical shape.

The invention is claimed as follows:

1. A sealed thrust bearing comprising first and second mutually concentric and axially spaced thrust rings rotatable relative to each other about a common axis, said rings defining mutually confronting annular races, an annular series of rotatable support elements intervening between said thrust rings in rolling engagement with both races to transmit thrust loads between said thrust rings, an inner annular bearing shell member spanning said thrust rings inwardly of said support elements, said inner bearing shell member having a static annular connection to one of said thrust rings and having a rotatable sealed connection with the other of said rings, an outer annular bearing shell member spanning said thrust rings outwardly of said rotatable support elements, said first thrust ring having a circular outer periphery and having a flat annular surface extending inwardly from said outer periphery on the inner side of said first thrust ring, said outer shell member having a medial portion which is circular in shape and substantially smaller in diameter than said outer periphery of said first thrust ring, said outer shell member having an annular spring flange integral with the first thrust ring end of said medial portion of said outer shell member and extending radially outward in adjacent relation to said inner flat annular surface on said first thrust ring, said outer shell member being shaped in its unstressed condition so that when the outer shell member is free of externally applied stress said annular spring flange has a truncated conical shape diverging away from said inner flat annular surface on said first thrust ring in a radially outward direction, said outer shell member having a peripheral mounting lip integral with said spring flange at the outer periphery of the latter and encircling said outer periphery of said first thrust ring, said annular spring flange being forceably flattened against said inner flat annular surface on said first thrust ring, said outer periphery of said first thrust ring defining thereon a sharp and substantially right angled annular corner spaced axially from said inner flat annular surface, the marginal edge of said mounting lip remote from said spring flange being turned sharply inward around said sharp corner on the outer periphery of said first thrust ring to form an anchoring flange holding said flattened spring flange flat against said inner flat annular surface on said first thrust ring to maintain the flattened spring flange in a permanent condition of residual stress which continuously urges the inner periphery of the spring flange hard against said inner flat annular surface and which continuously urges said anchoring flange hard against said sharp corner to form two narrow bands of high intensity sealing pressure between said outer shell member and said first thrust member, said second thrust ring defining a generally flat and radially extending end surface on the side thereof opposite from said rotatable support elements, and said outer shell member defining a sealing flange integral with said medial portion of the outer shell and extending radially inward into close fitting radially overlapping relation with said outer end surface on said second thrust ring to form therewith a capillary seal and allow relative rotation of said outer shell member and said second thrust ring.

2. A sealed thrust bearing comprising first and second mutually concentric and axially spaced thrust rings rotatable relative to each other about a common axis, said rings defining mutually confronting annular races, an annular series of rotatable support elements intervening between said thrust rings in rolling engagement with both races to transmit thrust loads between said thrust rings, an inner annular bearing shell member spanning said thrust rings inwardly of said support elements, said inner bearing shell member being rotatable in relation to one of said thrust rings and being circumferentially sealed to both of said rings, an outer annular bearing shell member spanning said thrust rings outwardly of said rotatable support elements, said first thrust ring having a circular outer periphery and having a flat annular surface extending inwardly from said outer periphery on the inner side of said first thrust ring, said outer shell member having a cylindrical portion encircling said support elements and said second thrust ring and being substantially smaller in diameter than said outer periphery of said first thrust ring, said outer shell member having an annular spring flange integral with the first thrust ring end of said cylindrical portion of said outer shell member and extending radially outward in adjacent relation to said inner flat annular surface on said first thrust ring, said outer shell member being shaped in its unstressed condition so that when the outer shell member is free of externally applied stress said annular spring flange has a truncated conical shape diverging away from said inner flat annular surface on said first thrust ring in a radially outward direction, said outer shell member having a peripheral mounting lip integral with said spring flange at the outer periphery of the latter and encircling said outer periphery of said first thrust ring, said annular spring flange being forceably flattened against said inner flat annular surface on said first thrust ring to produce in said outer shell member a residual stress permanently urging the juncture of the inner periphery of said spring flange with said cylindrical outer shell portion hard against said inner flat annular surface on said first thrust ring to form a narrow band of high intensity sealing pressure between said outer shell member and said inner flat annular thrust ring surface, the marginal edge of said mounting lip remote from said spring flange being turned radially inward around the outer periphery of said first thrust ring to form an anchoring flange holding said flattened spring flange flat against said inner flat annular surface on said first thrust ring, said second thrust ring defining a generally flat and radially extending end surface on the side thereof opposite from said rotatable support elements, and said outer shell member defining a sealing flange integral with said cylindrical portion of the outer shell and extending radially inward into close fitting radially overlapping relation with said outer end surface on said second thrust ring to form therewith a capillary seal and allow relative rotation of said outer shell member and said second thrust ring.

3. A sealed thrust bearing comprising first and second mutually concentric and axially spaced thrust rings rotatable relative to each other about a common axis, an annular series of rotatable support elements intervening between said thrust rings in rolling engagement with both rings to transmit thrust loads therebetween, means sealably connecting said thrust rings inwardly of said support elements for rotation relative to each other, an outer annular bearing shell member spanning said thrust rings outwardly of said rotatable support elements, said first thrust ring having a circular outer periphery and having an inner annular surface extending inwardly from said outer periphery on the inner side of said first thrust ring, said outer shell member having a medial portion which is circular in shape and substantially smaller in diameter than said outer periphery of said first thrust ring, said outer shell member having an annular spring flange integral with the first thrust ring end of said medial portion of said outer shell member and extending radially outward in adjacent relation to said inner annular surface on said first thrust ring, said outer shell member being shaped in its unstressed condition so that when the outer shell member is free of externally applied stress said annular spring flange diverges away from said inner annular surface on said first thrust ring in a radially outward direction; said annular spring flange being twisted out of its unstressed shape by forceable movement of the outer periphery of the spring flange toward said inner annular surface to locate the outer periphery of the spring flange in a fixed position which produces in said outer shell member a residual stress permanently urging said outer shell, at the inner periphery of said spring flange, hard against said inner annular surface on said first thrust ring to form a narrow band of high intensity sealing pressure between said outer shell member and said flat inner thrust ring surface; said outer shell member having a peripheral mounting lip integral with the outer periphery of said spring flange and coacting with the outer periphery of said first thrust ring to hold permanently the outer periphery of the spring flange in said fixed position thereof, and means on said outer shell member coacting with said second thrust ring to form a rotary seal therewith.

4. A sealed thrust bearing comprising first and second concentric thrust rings rotatable relative to each other about a common axis, a plurality of rotatable load support elements intervening between said thrust rings in rolling engagement with both rings to transmit thrust loads therebetween, means on said thrust rings inward of said rotatable load support elements and forming a rotary sealed connection between the rings, an outer annular bearing shell member spanning said thrust rings outwardly of said rotatable support elements, said first thrust ring having a circular outer periphery and having a flat annular surface extending inwardly from said outer periphery on the inner side of said first thrust ring, said outer shell member having a medial portion which is circular in shape and substantially smaller in diameter than said outer periphery of said first thrust ring, said outer shell member having an annular spring flange integral with the first thrust ring end of said medial portion of said outer shell member and extending radially outward in adjacent relation to said inner flat annular surface on said first thrust ring, said outer shell member being shaped in its unstressed condition so that when the outer shell member is free of externally applied stress said annular spring flange has a truncated conical shape diverging away from said inner flat annular surface on said first thrust ring in a radially outward direction, said outer shell member having a peripheral mounting lip integral with said spring flange at the outer periphery of the latter and encircling said outer periphery of said first thrust ring, said annular spring flange being forceably flattened against said inner flat annular surface on said first thrust ring, said outer periphery of said first thrust ring defining thereon a sharp annular corner spaced axially from said inner flat annular surface, the marginal edge of said mounting lip remote from said spring flange being turned sharply inward around said sharp corner on the outer periphery of said first thrust ring to form an anchoring flange holding said flattened spring flange flat against said inner flat annular surface on said first thrust ring to maintain the flattened spring flange in a permanent condition of residual stress which continuously urges the inner periphery of the spring flange hard against said inner flat annular surface and which continuously urges said anchoring flange hard against said sharp corner to form two narrow bands of high intensity sealing pressure between said outer shell member and said first thrust member, and means on said outer shell member coacting with said second thrust ring to form a rotary seal therewith.

5. A sealed thrust bearing comprising first and second mutually concentric thrust rings rotatable relative to each other about a common axis, a plurality of rotatable load support elements intervening between said thrust rings in rolling engagement with both rings to transmit thrust loads therebetween, means on said thrust rings inward of said rotatable load support elements and forming a rotary sealed connection between the rings, an outer annular bearing shell member spanning said thrust rings outwardly of said rotatable load support elements, said first thrust ring having a circular outer periphery and having a flat annular surface extending inwardly from said outer periphery on the inner side of said first thrust ring, said outer shell member having a medial portion which is circular in shape and substantially smaller in diameter than said outer periphery of said first thrust ring, said outer shell member having an annular spring flange integral with the first thrust ring end of said medial portion of said outer shell member and extending radially outward in adjacent relation to said inner flat annular surface on said first thrust ring, said outer shell member being shaped in its unstressed condition so that when the outer shell member is free of externally applied stress said annular spring flange has a truncated conical shape diverting away from said inner flat annular surface on said first thrust ring in a radially outward direction; said annular spring flange being forceably flattened against said inner flat annular surface on said first thrust ring to produce in said outer shell member a residual stress permanently urging said outer shell member, at the inner periphery of said spring flange, hard against said inner flat annular surface on said first thrust ring to form a narrow band of high intensity sealing pressure between said outer shell member and said inner flat annular thrust ring surface; means coacting with the outer periphery of said spring flange and the said first thrust ring to hold said flattened spring flange flat against said inner flat annular surface on said first thrust ring, and means on said outer shell member coacting with said second thrust ring to form an effective rotary seal between the outer shell member and the second thrust ring.

References Cited by the Examiner
UNITED STATES PATENTS 2,140,818 12/1938 Stein _____ 308—233

DAVID J. WILLIAMOWSKY, *Primary Examiner.*

F. SUSKO, *Assistant Examiner.*